(12) United States Patent
Chan

(10) Patent No.: US 9,041,249 B2
(45) Date of Patent: May 26, 2015

(54) ASYMMETRIC SERIES POWER PACKS WITH EFFICIENT DC-DC CONVERSION

(75) Inventor: Wen-Yen Chan, Thornhill (CA)

(73) Assignee: BlackBerry Limited, Waterloo, Ontario (CA)

( * ) Notice: Subject to any disclaimer, the term of this patent is extended or adjusted under 35 U.S.C. 154(b) by 421 days.

(21) Appl. No.: 13/486,302

(22) Filed: Jun. 1, 2012
(Under 37 CFR 1.47)

(65) Prior Publication Data

US 2013/0320765 A1 Dec. 5, 2013

(51) Int. Cl.
*H02J 1/00* (2006.01)
*H02J 7/00* (2006.01)
*H02J 1/10* (2006.01)

(52) U.S. Cl.
CPC ...... *H02J 1/00* (2013.01); *H02J 7/0016* (2013.01)

(58) Field of Classification Search
USPC .......................................................... 307/43
See application file for complete search history.

(56) References Cited

U.S. PATENT DOCUMENTS

| 3,105,909 A | 10/1963 | Jones |
| 3,718,848 A | 2/1973 | Hines |
| 5,552,643 A | 9/1996 | Morgan et al. |
| 5,710,504 A | 1/1998 | Pascual et al. |
| 6,140,799 A | 10/2000 | Thomasson |
| 6,841,971 B1 | 1/2005 | Spee et al. |
| 7,977,927 B2 | 7/2011 | Williams |
| 2007/0262755 A1 | 11/2007 | Hung et al. |
| 2010/0213897 A1 | 8/2010 | Tse |
| 2010/0289447 A1 | 11/2010 | Dobson et al. |
| 2011/0109268 A1 | 5/2011 | Lee et al. |

FOREIGN PATENT DOCUMENTS

EP 2385605 11/2011

OTHER PUBLICATIONS

EESR dated Oct. 12, 2012 for EP 12170511.

*Primary Examiner* — Robert Deberadinis
(74) *Attorney, Agent, or Firm* — Jeffrey Giunta; Fleit Gibbons Gutman Bongini & Bianco PL

(57) ABSTRACT

Systems and methods to operate a power supply. A power supply has an inductor and a capacitor coupled in a substantially series connection. The power supply has a first selectably conductive path that selectably couples a first power pack to the series reactive circuit and a second selectably conductive path that selectably couples the series reactive circuit to a substantially series combination of the first power pack and a second power pack. When the first power pack output voltage is above the threshold, the first selectably conductive path couples electrical current between the first power pack to the series reactive circuit. Otherwise, the second selectably conductive path couples electrical current between the series combination and the series reactive circuit. The controller further transfers charge from the second power pack to the first power pack.

16 Claims, 6 Drawing Sheets

ASYMMETRIC SERIES POWER PACKS WITH EFFICIENT DC-DC CONVERSION

FIELD OF THE DISCLOSURE

The present disclosure generally relates to power conditioning circuits for power packs and more particularly to power conditioning circuits drawing energy from multiple power packs.

BACKGROUND

Battery operated devices sometimes include circuitry, such as RF power amplifiers, that are able to be configured to operate in various modes that require different power supply voltages. Conventional power supplies are often designed to draw electrical energy from a fixed battery configuration. In an example of a portable communications device with an RF power amplifier that is able to be configured to operate at different power levels that also require correspondingly different power supply voltages, the entire range of voltages sometimes cannot be provided by a voltage reducing voltage regulator that is drawing power from a single battery. In order to be able to provide power to such RF power amplifiers, conventional power supplies are often designed to always draw power from two or more batteries that are connected in series.

Some battery chemistries able to be used in, for example, mobile handsets that are able to operate as they are discharged to low voltages. In some cases, these battery chemistries can be discharged to a final cell discharge voltage that is lower than the power supply voltage required by some circuits of the device being powered by those batteries. In order to accommodate these low discharge voltages, conventional systems incorporate: 1) using a buck-boost style converter, 2) using two series cells followed by only a buck converter, or 3) using a boost converter before a buck converter stage. All three of these approaches introduce inefficiencies in the operation of the power supply. For example, the use of a buck-boost style converter introduces inefficiencies due to the extra switches involved. The two series cells approach requires cell balancing in addition to introducing inefficiencies due to the high conversion ratios. Using a boost converter before the buck converter stage suffers from poor system efficiency due to the cascaded voltage conversion stages.

Therefore, the variability of circuit power supply voltages in different operating modes, and the wide operating range of discharging power packs, limits the efficiency of deriving operating power from power packs.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
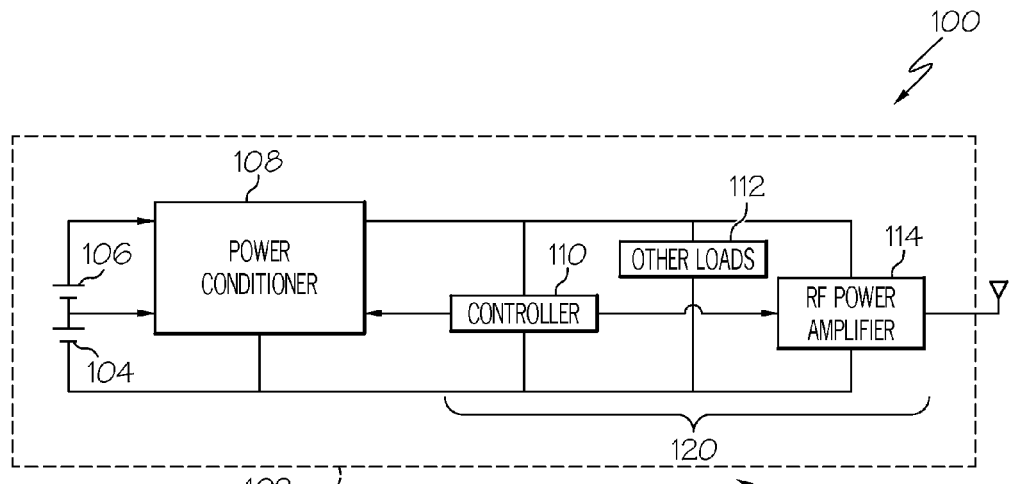
FIG. 1 illustrates a battery powered wireless communications device schematic diagram, according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically or electrically, according to context. Components are "communicatively coupled," as used herein, is defined as coupled such that a signal of any kind from one component can be received by the other component, directly or by way of an intermediate element. Connections described as "series" or "parallel" (or "substantially series" or "substantially parallel" or variations thereof) include but are not limited to connections that are strictly in series or in parallel. For example, two components may be deemed to be in series, though not strictly in series, if all but a negligible amount of electrical current passing through one component passes through the other. Similarly, the use of the "maximum" may be deemed to be the substantial maximum rather than the absolute or theoretical maximum. For example, reaching a maximum may include coming close enough to the maximum that a quantity can be treated as if it were the maximum.

The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, shaped, designed or otherwise configured to be carried and operated while being held in a human hand. One thing, such as a determination or a configuring or other action, is "based on" another thing when the one thing is dependent on, or responsive to, or proportional to, or otherwise a function of, the other. In the following discussion, the transfer of energy refers to transferring energy in any form, including but not limited to electrical, mechanical, or combinations of electrical and mechanical energy. Transfer of electrical energy is able to be made by one or more of electrical current transfer, changes in electric field intensities, changes in magnetic field intensities, or through any other energy transfer mechanism.

The below description refers to components that may be connected in a substantially parallel configuration. Components are connected in a substantially parallel configuration if they behave substantially as if they were strictly in parallel. Two or more components connected in a substantially parallel configuration are able to have terminals that are coupled together by any effective means. Two substantially parallel components are able to have one or both of the couplings between the two components consist of either direct couplings or indirect couplings. An indirect connection is able to include, as an example, a connection that include resistive components, reactive components, active components, or combinations of two or more of these types of components. The following description further describes components that may be in a substantially series configuration. Components are in a substantially series configuration if they behave substantially as if they were strictly in series, with all or nearly all of the current that passes through one component passing through the other. In a substantially serial arrangement, the power packs are able to also have other components coupled in series, such as resistive components, reactive components, active components, or combinations of two or more of these types of components.

Described below are systems and methods that effectively utilize two series connected power packs to produce a wide range of variable output voltages while efficiently converting electrical energy from the two batteries into the specified output supply voltage. In contrast to conventional power supplies, which are often designed to draw electrical energy from a fixed battery configuration, the below described systems and methods select either one battery or a series combination of batteries to drive a voltage reducing, or "bucking," voltage regulator. In one example of an RF power amplifier that is able to be configured to operate at different power levels, where the different power levels require a correspondingly different power supply voltages, the entire range of voltages sometimes cannot be provided by a voltage reducing voltage regulator that is drawing power from a single battery. In order to be able to provide power to such RF power amplifiers, conventional power supplies are often designed to always draw power from a series combination of two batteries and reduce that higher voltage to the required voltage. A voltage regulator that is reducing the combined voltage of a series of two batteries by a large amount, particularly if the voltage reduction is greater than the voltage of one of the series connected batteries, operate less efficiently than a voltage regulator that is reducing the battery output voltage by a lesser amount. This inefficiency caused by conventional power supply designs becomes more significant in battery powered devices that usually require power supply output voltages that are low enough to allow operation from a single battery.

Further, the systems and methods described below operate to efficiently transfer electrical energy from one of a first battery and a second battery of the series combination to the other of the first battery and the second battery, thereby allowing energy stored in one of the two batteries to be used to supply energy to the voltage regulator for a longer period. The below described systems and methods transfer electrical energy between the two batteries by storing energy in the same electrically reactive components that are used to filter the output of the bucking voltage regulator. The electrical switches that are used for the "bucking" voltage regulation of voltages drawn from either one battery or the series combination of two batteries are also used to control the flow of current between the batteries and the reactive components to transfer energy between the batteries. The reuse of electrical switches and the power supply reactive components for both output conditioning and filtering as well as for energy storage to transfer electrical energy between batteries allows a more economical circuit design. These cost savings are able to be particularly advantageous in some power supply designs where the electrical switching components can be large, expensive, and subject to large process variations, particularly in power supplies that are required to deliver high voltages, electrical currents, or both.

The examples described herein are able to provide advantages in supplying electrical power in various applications. The power supply designs described herein allow flexibility in the power supply voltages supplied to various operating circuits in a device, and allows power packs, such as batteries, of various sizes and capacities to be used to supply one or both of a minimum supply voltage and an additional voltage to augment the minimum supply voltage to either accommodate depletion of energy stored in one or more power packs or to provide selective changing of power supply voltages. The examples described herein are further able to be used in any type of device that derives electrical power from power packs, such as devices that receive different supply voltages or that present varying loads to the power supply based upon, for example, operating mode.

The examples described below provide more robust power pack based power supplies by drawing energy from one power pack or a series connected set of power packs in order to, for example, accommodate depleted energy storage of the power packs that result in a decrease in the output voltage of each power pack. These examples provide the more efficient switching of using a single power pack or a series connected set of power packs to provide the power supply voltage to a device with little or no change in size or weight of the devices relative to other device designs, such as designs that continuously operate their power supplies by drawing power from a series connected set of power packs. Such considerations of size and weight are particularly application and beneficial with smaller devices, such as handheld devices.

FIG. 1 illustrates a battery powered wireless communications device schematic diagram 100, according to one example. The battery powered wireless communications device schematic diagram 100 depicts a schematic diagram of a battery powered device 101 that is enclosed in a housing 102 that is supplied energy from two batteries, a first battery 104 and a second battery 106. The first battery 104 and the second battery 106 are examples of power packs that are used in various examples to provide electrical power to circuits or other electrical current consuming components. In further examples, power packs are able to include fuel cell electrical current generators, mechanically driven electrical current generators, and the like. In various examples, power packs, such as the illustrated batteries, are able to be rechargeable devices or non-rechargeable electrical current producing devices.

The first battery 104 and the second battery 106 provide electrical energy to a power conditioner 108. An example power conditioner 108 is descried in detail below. The power conditioner 108 provides electrical energy to various circuits and other electrical current consumers such as lights, displays, audible ringers, vibration motors, and the like. The power conditioner 108 in the illustrated example provides power to electrical circuits 120, which include in the illustrated example a controller 110, other electrical loads 112 and to a Radio Frequency (RF) power amplifier 114. In one example, the power conditioner 108 maintains a desired voltage of the electrical current provided to the electrical circuits 120 when the output voltage of one or both of the first battery 104 and the second battery 106 varies due to, for example, the state of charge of those batteries.

The battery powered device 101 includes an RF power amplifier 114 in one example that is configurable to operate at adjustable RF output power levels depending upon communications conditions. In accordance with various wireless communications protocols, a wireless communications device that is near a remote communications terminal, such as a cellular base station, is able to be configured to transmit RF signals at relatively low transmitted power level. A wireless communications device that is farther from, or has a higher amount of RF signal propagation loss to, the remote communications terminal is configured to transmit RF signals at higher transmitted power levels.

The controller 110 in one example is a processor that performs various tasks within the battery powered device 101. For example, the controller 110 performs processing to support successful voice and data communications via the particular wireless communications protocol used by the battery powered device 101. In one example, the controller configures the RF power amplifier 114 to transmit RF signals at transmitted power levels that are determined according to the current communications conditions of the battery powered device 101.

In one example, the RF power amplifier requires different power supply voltages based upon the specified value of the RF transmitted power level at which to transmit wireless communications signals. For example, the RF power amplifier 114 in one example is designed to operate at lower power supply voltages when it is transmitting RF signals at lower transmitted RF power levels. The RF power amplifier 114 is also designed to operate with higher power supply voltages when transmitting RF signals at higher transmitted power levels. In one example, the controller 110 configures the RF power amplifier 114 to transmit RF signals at a particular power level and further configures the power conditioner 108 to produce a power supply output supply voltage based upon the transmitted power level at which the RF power amplifier is configured. In one example, the RF power amplifier or another electrical load is considered to be operating in a first mode when it requires a low power supply voltage and is considered to be operating in a second mode when it requires a higher power supply voltage. In this example, the controller 110 is configured to specify, based upon a present mode in which the RF power amplifier, or another electrical load, is operating, a specified output voltage where the specified output voltage corresponds to a first power supply voltage when the electrical load is operating in the first mode, and corresponds to the second power supply voltage when the RF power amplifier or the other electrical load is operating in the second mode. As described below, the operation of the power conditioner 108 maintains the commanded voltage over a range of output voltages produced by the first battery 104 and the second battery 106.

In various examples, the controller 110 and the other loads 112 are configured to operate with power supply voltages that vary over the ranged required by the RF power amplifier 114 to efficiently operate over its controllable transmitted RF power level range. In general, the controller 110 and the other loads 112 are configured to operate with a particular power supply voltage that is the minimum output voltage produced by the power conditioner 108. The RF power amplifier 114 of one example operates at this minimum output voltage when transmitting RF signals at a lower transmitted RF power level. As the transmitted RF power level is increased, for example in order to accommodate poor wireless communication conditions, the controller increases the output voltage to the level required by the specified transmitted RF power level.

In normal operations, the battery powered device 101 transmits RF signal only for brief time intervals. Even when the battery powered device 101 is transmitting RF signals, the RF power amplifier 114 is often configured to transmit at lower power levels and therefore is able to operate at the minimum output voltage. The power conditioner 108 of one example is able to provide lower output voltages to the electrical circuits 120 by drawing electrical energy from one power pack. In various examples, the power conditioner 108 received indications of specified output voltages, which are electrical voltages to be produced by the power conditioner and supplied to electrical power consuming circuits, such as the other loads 112 and the RF power amplifier 114. The power conditioner 108 receives these indications of specified output voltages and configures components within the power conditioner 108 to produce the output voltage.

Figure 2:
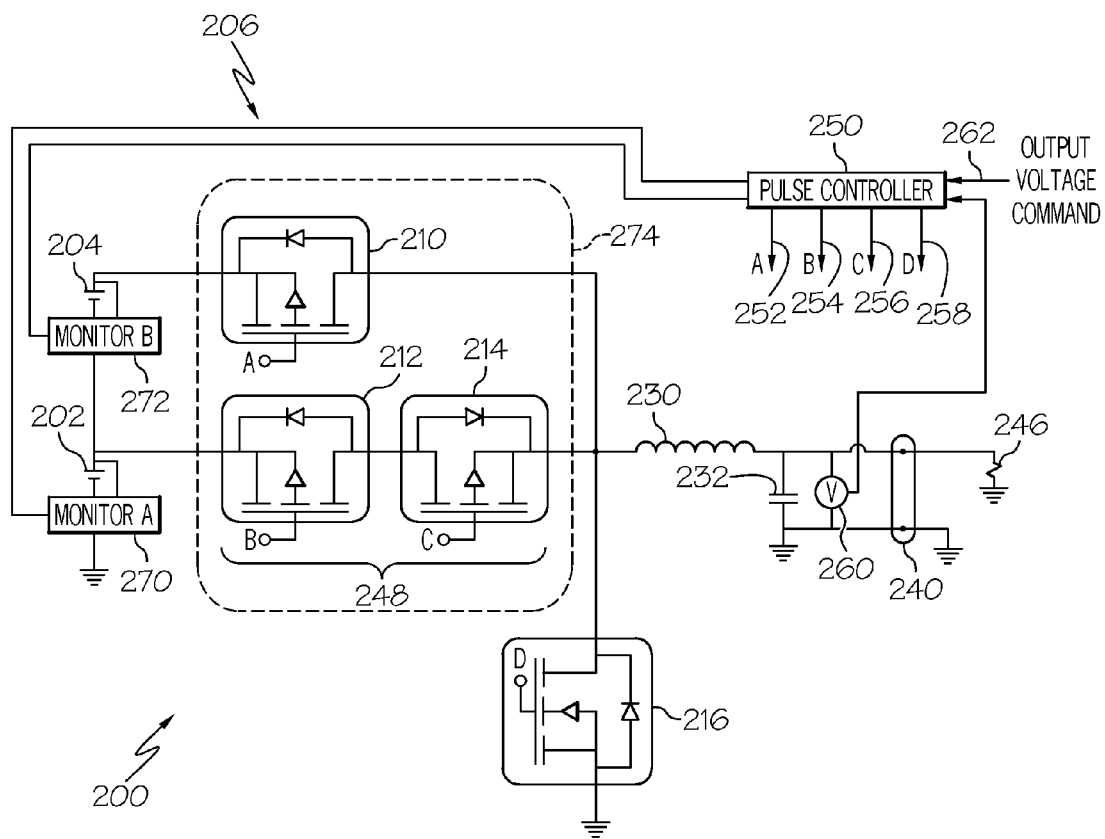
FIG. 2 illustrates a two battery power conditioner schematic diagram, in accordance with one example.

FIG. 2 illustrates a two battery power conditioner schematic diagram 200, in accordance with one example. The two battery power conditioner schematic diagram 200 includes a two battery power conditioner 206 that is similar to the power conditioner 108 discussed above, which operates with two power packs, which are realized as batteries in this description, that are connected in a substantially series connected combination with one another. In the following discussion, the substantially series combination of the first battery 202 and the second battery 204 is referred to as a series combination or a series connection. The following use of the terms series combination or series connection is to be understood to include substantially series coupling of two or more components. The principles and operation of the two battery power conditioner 206 that are discussed below are applicable to other types of power packs that provide electrical energy to electrical loads.

A first battery 202 and a second battery 204 are configured in a substantially series combination with one another and the two battery power conditioner 206 is separately connected to each output of those two batteries. In the following discussion, the output of a battery is used to refer to the positive output terminal of the battery. In further examples, a power pack output is able to be other power pack terminals, such as a negative terminal or both terminals of the power pack.

The two battery power conditioner 206 includes a power pack interface 274 that selectably connects the positive output of first battery 202 and the second battery 204 to components of the two battery power conditioner 206, as is discussed in detail below. The power pack interface 274 allows the two battery power conditioner 206 to be selectably connected to the output of either of those two batteries. In operation, as is described in further detail below, the two battery power conditioner 206 is able to configure one of two selectably conductive paths within the power pack interface 274 to draw electrical current from either just the first battery 202, or from the series combination of the first battery 202 and the second battery 204. In various examples, a power pack interface is able to be implemented by using selectively conductive paths that include one or more semiconductor transistors incorporating various technologies, such as FET, bi-polar, or other types of semiconductor devices, as well as other types of switching devices including other electrical devices, mechanical devices, or combinations of those.

Selecting whether to draw electrical current from just the first battery 202 or the series combination of the first battery 202 and the second battery 204 is able to be based upon the required output voltage the two battery power conditioner 206 is to produce and the charge state of charge of each of the first battery 202 and the second battery 204. The state of charge of the first battery 202 and the second battery 204 affects the output voltage of those batteries. An output voltage command 262 is received from an external controller in one example, such as from the controller 110 discussed above, and contains an indication of a specified output voltage that indicates the output voltage 242 that is to be provided to a load 246. The indication of specified output voltages received in the output voltage command 262 is able to be in any form, such as a digital data block, a pulse width modulated signal, a voltage level that is able to have continuously variable level or defined levels, or any type of data indication. The indication of specified output voltage is able to be expressed as absolute or relative values referenced to, for example, a base output voltage for the two battery power conditioner 206. Examples of components of the load 246 are the electrical circuits 120 discussed above.

The two battery power conditioner 206 of one example is able to operate in three modes of operation based upon one or more of the output voltage that is it to produce and the state of charge of one or both of the first battery 202 and the second battery 204. In a first mode of operation, the two battery power conditioner 206 accepts electrical energy from the first battery 202 alone and provides an output current to a power supply output port 240 to supply to a load 246. In a second mode of operation, the two battery power conditioner 206 accepts electrical energy from the series combination of the first battery 202 and the second battery 204 and provides an output current to the power supply output port 240 to supply the load 246. In a third mode of operation, electrical energy is transferred from one of the second battery 204 and the first battery 202 to the other of those batteries in order to accommodate various amounts of electrical current that are drawn in the first mode of operation and the second mode of operation. These modes of operation are described in further detail below. In various examples, a two battery power conditioner is able to have a structure similar to the illustrated power supply output port 240 that delivers electrical current at a specific voltage to electrical current consuming devices. Circuitry similar to the illustrated power supply output port 240 is able to include electrical connections within a device that do not have a detachable interface or other characteristics that identify a distinguishable port. Further power supply output ports are able to couple electrical power through electrically conductive mechanisms, electric field coupling mechanisms, magnetic field coupling mechanisms, or by any combination of these coupling mechanisms.

The operation of the two battery power conditioner 206 in one example is controlled by a pulse controller 250. Pulse controller 250 is an example of a conductive path controller that receives output voltage commands 262, which contains indications of a specified output voltage. The pulse controller 250 of one example produces an output power supply current at the specified output voltage by turning on or turning off various transistors or other devices within the two battery power conditioner 206. The pulse controller further perform other operations by turning on or turning off various transistors or other devices within the two battery power conditioner 206, such as transferring energy between the second battery 204 and the first battery 202. The pulse controller 250 has an Output A 252, and Output B 254, and Output C 256 and an Output D 258. These outputs are connected to the respective gates of switching transistors and are activated as required by a particular mode of operation. The pulse controller 250 of one example receives measured output voltage data from an output voltmeter 260. The output voltage is able to be determined by an output voltmeter that is part of the two battery power conditioner 206, or by a voltage measurement device that is external to the two battery power conditioner 206 and that reports indications of output voltages to the pulse controller.

The batteries depicted in the two battery power conditioner schematic diagram 200 each have an associated monitoring circuit. The first battery 202 has an associated monitor A 270 and the second battery 204 has an associated monitor B 272. These monitoring circuits in one example operate to monitor the voltage produced by its associated battery and also measure the electrical current flowing through each battery. Monitor A 270 and monitor B 272 each provide indicators of their measurements and determined quantities to the pulse controller 250.

In one example, the monitoring circuit, such as monitor A 270 or monitor B 272, associated with each battery is incorporated into the package of the battery. Other examples include monitoring circuits external to the battery. One example of a monitoring circuit is a commonly used "battery fuel gauge" circuit that is a dedicated circuit that monitors the output voltage and electrical current produced by its associated battery and further produces an estimate of remaining battery capacity or charge level. In one example, the monitoring circuits produce a time series of battery output voltages for its associated battery and provide these time series of battery output voltages to the pulse controller 250. In various examples, the time series of battery output voltages includes data describing the output voltage of the different batteries at different times. In various examples, the data in the time series of battery output voltages is able to reflect the output voltage of the batteries at times that are separated by uniform time periods, or the values in the time series of battery output voltages are able to reflect battery output voltages that are separated by different time intervals that are able to be different, within a defined tolerance of a uniform time interval, or by time intervals with any value. Further, the time series of battery output voltages is able to include data that reflects the output voltage of different batteries at different times. In the above described example with a first battery and a second battery, the time series of battery output voltages is able to include the output voltage of the first battery at a first series of time points and the output voltage of the second battery at a second series of time points, where some or all of the time points in the first series of time points are different time points than the time points in the second series of time points.

In the first mode of operation, electrical current is routed from the first battery 202 through transistor B 212 and transistor C 214, which are connected in series to form a transistor pair 248. This electrical current proceeds through inductor 230 to the power supply output port 240. The operation of inductor 230 and capacitor 232 provides voltage smoothing and noise filtering for the output voltage delivered to the power supply output port 240. The inductor 230 and capacitor 232 are able to be coupled in a substantially series combination and is an example of a series reactive circuit. The below reference to a series reactive circuit is not to exclude the understanding that the inductor 230 and the capacitor 232 are able to be coupled in a substantially series configuration. Further, it is understood that a series reactive circuit may be made up of circuit elements and need not be a complete circuit in and of itself, and that that a series reactive circuit may include a resistive component, while being substantially reactive. In further examples, a series reactive circuit is able to have two or more reactive components, in addition to zero or more resistive components, that are arranged in any configuration to perform similar functions as are described herein.

The transistor pair 248 is an example of a first selectably conductive path that is configurable to couple electrical current between the first power pack and the series reactive circuit. It is also to be noted in the two battery power conditioner schematic diagram 200, that the capacitor 232 is connected in a substantially parallel configuration with the power supply output port 240 and voltmeter 260.

In normal operation, the first battery 202 has an output voltage that is higher than the specified output voltage to be delivered to the power supply output port 240. In such an instance, transistor B 212 operates in conjunction with transistor D 216 as a switching, or bucking, voltage reducing regulator. As is described in further detail below, the pulse controller 250 operates to alternate turning on transistor B 212 and turning off transistor D 216 for an interval of time, and then turning off transistor B 212 and turning on transistor D 216. When transistor B 212 is on and transistor D 216 is off, voltage builds on capacitor 232. When the output voltage reaches the specified level, transistor B 212 is turned off and transistor D 216 is turned on to drain energy from the capacitor 232 and thereby reduce the output voltage 242 on the capacitor 232. By alternating the on/off duration of transistor B 212 and transistor D 216, the output voltage 242 can be maintained at a voltage below that produced by the first battery 202.

In this first mode of operation, the transistor C 214 is "locked on" to provide a conductive path through transistor B 212 when transistor B 212 is on. Transistor A 210 is turned off in this first mode of operation since no electrical current is to be drawn from the second battery 204 in this mode. The control of transistor C 214 and transistor A 210 is provided by outputs of the pulse controller 250 at its output C 256 and output A 252, respectively.

In the second mode of operation, electrical current is routed from the series combination of the first battery 202 and the second battery 204 through transistor A 210 and on through inductor 230 to the power supply output port 240. Transistor A 210 is an example of a second selectably conductive path configurable to couple electrical current between a substantially series connected combination of the first power pack and a second power pack and the series reactive circuit. Similarly to the operation described above, inductor 230 and capacitor 232 provide voltage smoothing and noise filtering for the output voltage 242 delivered to the power supply output port 240. In normal operation, the series combination of the first battery 202 and the second battery 204 has an output voltage that is higher than the specified output voltage to be delivered to the power supply output port 240. In such an instance, Transistor A 210 operates in conjunction with Transistor D 216 as a switching, or bucking, voltage reducing regulator. In a manner similar to that described above with regards to the first mode of operation, and as is described in further detail below, the pulse controller 250 operates to alternate turning on Transistor A 210 and turning off Transistor D 216 for an interval of time, and then turning off Transistor A 210 and turning on Transistor D 216. When Transistor A 210 is on and Transistor D 216 is off, voltage builds on capacitor 232. When the output voltage reaches the specified level, transistor A 210 is turned off and transistor D 216 is turned on to drain energy from the capacitor 232 and thereby reduce the output voltage 242 on the capacitor 232. By alternating the on/off duration of transistor A 210 and transistor D 216, the output voltage 242 can be maintained at a voltage below that produced by the series combination of the first battery 202 and the second battery 204.

In the second mode of operation, transistor B 212 and transistor C 214 are driven into an off state by the pulse controller 250. The series transistor C 214 is provided in one example to ensure that transistor B 212 does not conduct when it would be reversed biased by the voltage of the second battery 204 when transistor A 210 is on. As is understood by practitioners of ordinary skill in the relevant arts, field effect transistors, such as transistor B 212, have a characteristic modeled as an "internal diode" within the transistor that operates to effectively "turn on" the transistor when the transistor has a reverse voltage bias, even though the transistor's gate is driven into an off state. Transistor C 214, which is in series with transistor B 212 and has a reverse orientation of its drain and source, will effectively "turn off" when the voltage of the second battery 204 is across the series connected transistor B 212 and transistor C 214.

In one example, the two battery power conditioner 206 is able to change between the above described first mode of operation and the second mode of operation as one or both of the specified output voltage and the output voltage of the first battery change. In one example, the pulse controller receives a time series of values of the first power pack output voltage, where each value in the time series of values reflecting a respective first power pack output voltage determined at a time that is different than other values in the time series of values. In response to receiving each value, the pulse controller 250 is able to maintain operating in either the first mode of operation or the second mode of operation. Based upon the received value of the measured output voltage of the first battery 202, the pulse controller 250 is also able to change between one of the first mode of operation and the second mode of operation to the other mode of operation.

In the third mode of operation, electrical energy is transferred between the second battery 204 and the first battery 202. In one example, this operation is performed when the two battery power conditioner 206 is not providing appreciable power at its power supply output port 240. In one example, a load connected to the power supply output port 240 is placed into a standby or powered down mode during normal operations to conserve electrical energy. While the load is in a standby or powered down mode, the two battery power conditioner 206 is able operate in the third mode of operation to transfer electrical energy from either the second battery 204 to the first battery 202, or from the first battery 202 to the second battery 204.

In a first example of the third mode of operation, electrical energy is transferred from the second battery 204 to the first battery 202. In this example of the third mode of operation, the pulse controller 250 operates to turn off transistor B 212 and transistor C 214, and to turn on transistor A 210 so as to cause electrical current to flow through inductor 230 and into the capacitor 232. This operation corresponds to configuring the first selectably conductive path to not couple electrical current between the first battery 202 and the series reactive circuit, and configuring the second selectably conductive path to couple electrical current between the substantially series connected combination of the first battery and the second battery and the series reactive circuit. The inductive properties of inductor 230 can cause current to continue to flow into capacitor 232 such that the voltage across capacitor 232 will exceed the voltage of the series connected first battery 202 and the second battery 204. In order to facilitate the current flow into capacitor 232, once transistor A 210 is turned off, pulse controller 250 turns on transistor D 216. The above switching of transistors within the two battery power conditioner 206 causes electrical current to flow into capacitor 232 until the inductor current reduces to a value that is substantially zero. As the inductor current reaches substantially zero, the voltage across capacitor 232 reaches a maximum value.

The pulse controller 250 is able to use various techniques to determine when to configure the transistors to stop conducting. In one example, the pulse controller 250 monitors or determines when the inductor current reaches zero or falls below an inductor current threshold value. In the above described configuration where the second selectably conductive path is configured to couple electrical current between the substantially series connected combination of the first power pack and a second power pack and the series reactive circuit, the inductor current can be determined by monitoring the electrical current flowing through either or both the first battery 202 or the second battery 204, such as is reported by monitor A 270 or monitor B 272, respectively. In an alternative example, the pulse controller 250 is able to determine that the inductor current reaches substantially zero by monitoring the voltage across capacitor 232, such as is reported by the voltmeter 260, and determining when that voltage reaches a maximum value. The pulse controller 250 is able to determine a maximum value of voltage across the capacitor 232 by monitoring the rate of change of the voltage reported by voltmeter 260 and determining that the rate of change is reducing to below a threshold, such as approaching substantially zero.

The operation of the above described portion of the first example of the third mode of operation is also able to be described as configuring the second selectably conductive path to couple electrical current between the substantially series connected combination of the first battery and the second battery and the series reactive circuit until the inductor current, which is the electrical current flowing through inductor 230, until the inductor current reduces to be substantially zero. In further examples, the second selectably conductive path is configured to couple electrical current between the substantially series connected combination of the first battery and the second battery and the series reactive circuit until the inductor current reduces to a level that is below a threshold. Such a threshold is able to be determined according to various design considerations for the particular power supply application.

Once the voltage on capacitor 232 has reached a maximum, the pulse controller 250 operates to turn off transistor D 216 and turn on transistor B 212 and transistor C 214. This is an example of configuring, in response to the inductor current reducing to below an inductor current threshold, a first selectably conductive path to couple electrical current between the first power pack and the series reactive circuit. The energy stored in capacitor 232 then flows into the first battery 202. The inductive property of inductor 230 causes current to flow into the first battery 202 even as the voltage across capacitor 232 decreases to below that of the output voltage of the first battery 202. In one example, the pulse controller determines inductor current, i.e., the electrical current flowing through inductor 230, in this portion of the first example of the third mode by monitoring the electrical current flowing through the first battery 202 when the first selectably conductive path is configured to couple electrical current between the first power pack and the series reactive circuit. In one example, the electrical current flowing through the first battery, which is equal to the inductor current in this configuration of the first selectably conductive path, as reported by monitor A 270 is monitored by the pulse controller to determine that the inductor current is reduced to below an inductor current threshold. In one example, this inductor current threshold corresponds to a substantially zero electrical current level. In one example, in response to determining that the inductor current reduces to below that inductor current threshold, the second selectably conductive path is again configured to couple electrical current between the substantially series connected combination of the first power pack and a second power pack and the series reactive circuit. This configuration is maintained until an inductor current reduces to below the inductor current threshold. This configuration of the first selectably conductive path and the second selectably conductive path is able to be repeated to transfer energy between the second battery 204 and the first battery 202.

The above example monitors electrical current flowing through or voltages across energy storing reactive components in order to determine when to switch transistors on or off. In these examples, the transistors are configured in an on or an off condition for respective time intervals. In the above examples, the end time of a particular time interval is determined during that time interval, whereby the end time of the particular time interval is identified as it occurs based upon the measured value of, for example, a value of the electrical current flowing through the inductor 230, or a voltage across the capacitor 232.

In further examples, determining when to turn transistors on or off to configure various selectably conductive paths to conduct or not conduct is able to be performed by alternative techniques. For example, transistors are able to be turned on and off for defined time intervals in order to perform the above described sequence of transistor switching. The defined time intervals are able to be defined based upon, for example, respective voltages that presently produced by the first power pack 202 and the second power pack 204. In these examples, the time intervals are determined before the transistors are turned on or off for the particular phase of the third mode of operation.

In a second example of the third mode of operation, electrical energy is transferred from the first battery 202 to the second battery 204. In this second example of the third mode of operation, the pulse controller 250 operates in a manner similar to that described above for the first example of the third mode of operation, except that energy is transferred from the first battery 202 to the capacitor 232, and then the energy stored in the capacitor 232 is transferred to the series connected combination of the first battery 202 and the second battery 204. Although the electrical current from the capacitor 232 flows through the series combination of the first battery 202 and the second battery 204, the result of the second example of the third mode of operation causes energy to be transferred from the first battery 202 to the second battery 204.

In the second example of the third mode of operation, the pulse controller operates to first turn on transistor B 212 and transistor C 214, and to turn off transistor A 210 so as to cause electrical current to flow from the first battery 202 through inductor 230 and into the capacitor 232. This is an example of configuring a first selectably conductive path to couple electrical current between the first power pack and the series reactive circuit. In one example, electrical current flows from the first battery 202 into the capacitor 232 until a maximum voltage across the capacitor is reached. A determination of a maximum voltage across the capacitor 232 is determined in a manner similar to those discussed above. In one example, once the energy stored in capacitor 232, as reflected by the voltage across capacitor 232, reaches a maximum level, transistor D 216 is turned on for a brief period. Turning on transistor D 216, and thereby connecting one end of inductor 230 to ground, for a brief period after the voltage across capacitor 232 reaches a maximum level causes electrical current to flow through inductor 230. The electrical current flowing through inductor 230 causes energy to be stored in inductor 230.

After the brief period for which transistor D 216 is turned on, the pulse controller 250 operates to turn off transistor D 216 and to turn on transistor A 210. By turning off transistor D 216 and turning on transistor A 210, electrical current flows from the capacitor 232, through inductor 230 and into the series combination of the first battery 202 and the second battery 204. In examples where transistor D 216 is turned on for a brief period prior to a point where it is turned off and transistor A 210 is turned on, the energy stored in inductor 230 causes the voltage across inductor 230 to increase to a level that results in electrical current flowing into the series combination of the first battery 202 and the second battery 204. In other words, due to the electrical current flowing through inductor 230, the voltage across the inductor 230 will increase to a level such that the voltage across the series connected inductor 230 and capacitor 232 will equal or slightly exceed the voltage across the series combination of the first battery 202 and the second battery 204. This operation corresponds to configuring the first selectably conductive path to not couple electrical current between the first battery 202 and the series reactive circuit, and configuring the second selectably conductive path to couple electrical current between the substantially series connected combination of the first battery and the second battery and the series reactive circuit.

The above described two battery power conditioner 206 is able to be configured to produce a wide range of variable output voltages while efficiently converting electrical energy from the two batteries into the specified output supply voltage. Conventional power supplies are often designed to draw electrical energy from a fixed battery configuration. In the above described scenario where an RF power amplifier is able to be configured to operate at different power levels where the different power levels require a correspondingly different power supply voltage, the entire range of voltages sometimes cannot be provided by a voltage reducing voltage regulator that is drawing power from a single battery. In order to be able to provide power to such RF power amplifiers, conventional power supplies are often designed to always draw power from the series combination of the first battery 202 and the second battery 204 and reduce that higher voltage to the required voltage. A voltage regulator that is reducing the combined voltage of a series of two batteries by a large amount, particularly if the voltage reduction is greater than the voltage of one of the series connected batteries, operate less efficiently than a voltage regulator that is reducing the battery output voltage by a lesser amount. This inefficiency caused by conventional power supply designs becomes more significant in battery powered devices 101 that usually require power supply output voltages that are low enough to allow operation from a single battery.

The above described two battery power conditioner 206 and method of operation improves power supply efficiencies in devices that require variable power supply voltages, particularly when the power supply voltage is often able to be effectively provided by a voltage reducing power supply drawing power from a single battery as opposed to a series connected pair of batteries.

The above described two battery power conditioner 206 is further able to efficiently operate with battery chemistries that are able to operate while being discharged to low output battery voltages. In a case where the first battery 202 discharges to a level that is too low to effectively supply even lower specified output voltages, the two battery power conditioner 206 is able to switch into its second mode of operation and draw power from the series combination of the first battery 202 and the second battery 204. The two battery power conditioner 206 in this example is able to efficiently operate from the first battery 202 while the output voltage of the first battery is sufficiently high to provide the specified output voltages, and switch to drawing power from the series combination of the first battery 202 and the second battery 204 when the output voltage of the first battery 202 falls below a level that allows operation while drawing from only the first battery 202.

The above described systems and methods include power supplies that selectively draw electrical energy from either a first battery 202 or from a series connected pair of batteries that includes the first battery 202. As such, certain operational scenarios are able to arise where the first battery 202 depletes to a level where its output voltage is too low to support the first mode of operation even when the specified output voltage is relatively low. Rather than address this condition by drawing electrical energy from the series connected pair of batteries, which introduces power conversion inefficiencies, the two battery power conditioner 206 of one example operates in the third mode of operation to transfer electrical energy from the second battery 204 to the first battery 202. In this scenario, after the transfer of energy from the second battery 204 to the first battery 202 the two battery power conditioner 206 is able to operate more efficiently by continuing to provide the specified power supply voltage to the electrical load 246 by drawing electrical energy from only the first battery 202.

Selection of Battery Sizes

As discussed above, the load 246 of various examples often operates at a low voltage, but sometimes operates in a mode that requires a supply voltage that exceeds the voltage level that can be produced by a two battery power conditioner 206 when operating from only the first battery 202, i.e., operating in the first mode of operation. As described above, higher power supply voltages are able to be delivered to the load 246 by operating in the second mode of operation when electrical energy is drawn from the series connected battery pair consisting of the first battery 202 and the second battery pair 204. Particular battery powered devices, such as the battery power device 101, are often used in statistically predictable manners that allow an estimation of the amount of electrical energy consumed by the load 246 at voltages that can be supplied by drawing power from just the first battery 202, and also how much electrical energy is consumed by the load 246 at voltages that require drawing power from the series connected battery pair consisting of the first battery 202 and the second battery 204.

In one example, a battery powered device 101 includes a first battery 202 that has a different total capacity than the second battery 204. In the following discussion, total capacity of a battery or power pack is used as the term "capacity" is generally understood when referring to power packs. In the following discussion, capacity refers to a present energy capacity of a power pack, such as a battery. For example, power pack capacity may refer to a number of Amp-Hours remaining within a power pack or a percentage of the power pack's total designed capacity when fully charged. Power pack capacity as used below generally refers to a charge level of a power pack or a comparable measure of any suitable power pack. The term total capacity refers to the energy stored in the battery or power pack when it is completely or fully charged.

In one example, the respective total capacities of the first battery 202 and the second battery 204 are determined in one example based upon statistics that estimate 1) a first energy amount that is the amount of energy that is expected to be consumed by the load 246 when the two battery power conditioner 206 is drawing energy from only the first battery 202, and 2) a second energy amount that is the amount of energy that is expected to be consumed by the load 246 when the two battery power conditioner 206 is drawing energy from the series connected battery pair consisting of both the first battery 202 and the second battery 204. In one example, the first power pack 202 is specified to have a first total capacity and the second power pack 204 is specified to have a second total capacity, an a ratio between the first total capacity and the second total capacity is based upon an energy ratio that has a value based upon a ratio of the first energy amount to the second energy amount. In one example, the energy ratio is based upon an expected mode time ratio, which is a ratio between an expected amount of time that the load 246 draws energy from only the first battery and an expected amount of time that the load 246 draws energy from the series connected battery pair consisting of both the first battery 202 and the second battery 204

In order to simplify the description of the above described system and methods, the above description uses an example of a battery powered device 101 that includes two batteries, and a two battery power conditioner 206 that produces specified output voltages by drawing from one or a series combination of two batteries. It is to be noted that some or all of the above described concepts are easily applied to systems that draw power from power packs of any design, such as rechargeable energy storage devices of any design, fuel cells, and the like. In the case of fuel cells, it is noted that transfer of energy from a source power pack to a destination power pack, such as is described above for the third mode of operation, is not performed when the destination power pack is a fuel cell due to the inability of recharging a fuel cell by apply an input electrical current. The principles of the above descried system and methods are also easily extended to designs that utilize three or more power packs, power packs of differing designs, or any other power supply application.

Figure 3:
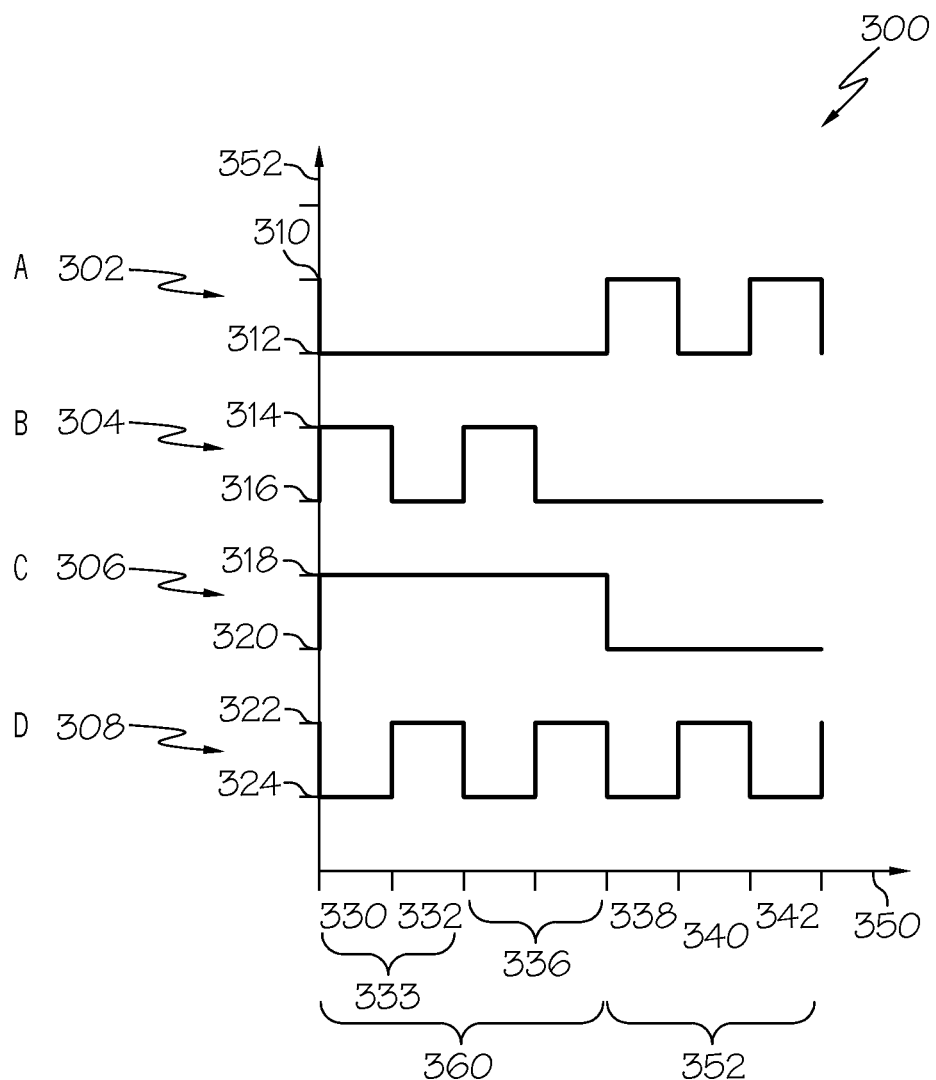
FIG. 3 illustrates a power delivery transistor control timing diagram, in accordance with one example.

FIG. 3 illustrates a power delivery transistor control timing diagram 300, in accordance with one example. Referring to FIG. 2, the output A level versus time relationship 302 depicts the logic or voltage output levels present on the Output A 252 that is an input into the gate of transistor A 210. The output A level versus time relationship 302 depicts two states, an output A logic low state 312 and an output A logic high state 310. Similarly, the output B level versus time relationship 304 depicts the logic or voltage output levels present on the Output B 254 that is an input into the gate of transistor B 212; the output C level versus time relationship 306 depicts the logic or voltage output levels present on the Output C 256 that is an input into the gate of transistor C 214; the output D level versus time relationship 308 depicts the logic or voltage output levels present on the Output D 258 that is an input into the gate of transistor D 216. The two states are also each depicted for output B level versus time relationship 304, an output B logic low state 316 and an output B logic high state 314; the output C level versus time relationship 306, an output C logic low state 320 and an output C logic high state 318; and the output D level versus time relationship 308, an output D logic low state 324 and an output D logic high state 322. As is generally understood, the depicted logic levels are able to reflect the voltage of these signals, or the voltage is able to be reversed based upon the design of circuitry implementing the switches driven by these outputs.

The power delivery transistor control timing diagram 300 depicts two time segments, a first time segment 360 and a second time segment 362. The level versus time relationships shown during the first time segment 360 correspond to the above described first mode of operation for the two battery power conditioner 206 where electrical energy is accepted from the first battery 202 alone and provided as an output current to the power supply output port 240 to supply to a load 246. The level versus time relationships shown during the second time segment 362 correspond to the above described second mode of operation two battery power conditioner 206 where the electrical energy is accepted from the series combination of the first battery 202 and the second battery 204 and provided as an output current to a power supply output port 240 to supply the load 246.

As discussed above, when operating in the first mode of operation, the two battery power conditioner 206 alternates between configuring the transistor pair 248, which consists of transistor B 212 and transistor C 214, to conduct and not conduct, and alternating the configuration of transistor D 216 to not conduct or conduct such that only one of the transistor pair 248 or transistor D 216 conducts at a given time. When operating in the first mode of operation, the two battery power conditioner 206 configures transistor C 214 into a conducting state. The output level C versus time relationship 306 reflects this by indicating that output C 256 is in a high state during all of the first time segment 360.

The power delivery transistor control timing diagram 300 includes a first time interval 330 during which the output B level versus time relationship 304 indicates that the output B 254 is in a high state. The output D level versus time relationship 308 indicates that Output D 258 is in a low state during the first time interval 330. In a second time interval 332, which immediately follows the first time interval 330 in the illustrated example, the output B level versus time relationship 304 indicates that the output B 254 is in a low state and output D level versus time relationship 308 indicates that Output D 258 is in a high state, thus alternating from their states of the previous time interval.

The first time interval 330 and the second time interval 332 are combined in this description to form a first time period 333. During this first time period 333, transistor B 212 and transistor D 216 are cycled once between each of conducting and non-conducting states, where transistor B 212 and transistor D 216 are each in a different one of those states. The power delivery transistor control timing diagram 300 further presents a second time period 336 during which transistor B 212 and transistor D 216 are alternated one more time between conducting and non-conducting states. The operation and interaction of transistor B 212 and transistor D 216 result in electrical current being provided to inductor 230 when transistor B 212 is conducting, and the current provided by the inductive properties of inductor 230 is allowed to flow in a complete circuit when transistor D 216 is conducting and neither of transistor B 212 or transistor A 210 are conducting.

In the first time period 333, transistor B 212 and transistor D 216 operate as a "voltage bucking" regulator where the load 246 is provided with a voltage that is less than the voltage of the first battery 202. The amount of voltage reduction performed by the combination of transistor B 212 and transistor D 216 is based upon the ratio of the time duration between the first time interval 330 and the second time interval 332. As the duration of the first time interval 330 increases relative to the duration of the second time interval 332, more electrical current is transferred from the first battery 202 to the inductor 230 and load 246, resulting in a higher voltage being presented to the load 246. Similarly, reducing the duration of the first time interval 330 relative to the duration of the second time interval reduces the current provided to the inductor 230 and load 246, thereby decreasing the voltage presented to the load 246. In one example, output voltmeter 260 monitors the voltage provided to load 246 and the pulse controller 250 adjusts the relationship between the first time interval 330 and the second time interval 332 to cause the specified output voltage to be delivered to the load 246.

In one example, the maximum output voltage that is able to be delivered to the load 246 when drawing electrical current from only the first battery 202 is less than the output voltage produced by the first battery. The difference between the first battery output voltage and the maximum output voltage delivered to the load 246 that is able to be delivered in the first mode of operation is a result of voltage drops introduced by the transistor pair 248 when both transistor B 212 and transistor C 214 are in a conducting state. In some examples, the components of the two battery power conditioner 206 do not operate in a mode where conductive paths, such as are formed by the transistor pair 248 or transistor A 210, are able to be configured to conduct for long periods of time. As such, such two battery power conditioners have a duty cycle of conducting between the power packs, such as the first battery 202 or the series combination of the first battery 202 and the second battery 204, that is less than 100%. Due to this less than full time duty cycle, an additional voltage drop is incurred between the power packs and the load 246. Such a voltage drop is often referred to as a "regulator drop-out" voltage.

Various scenarios are able to cause the two battery power conditioner 206 to not be able to deliver a specified output voltage to the load 246. In one scenario, the output voltage of the first battery 202 in conjunction with the voltage drop caused by the path between the output of the first battery 202 and the load 246, which includes transistor B 212, transistor C 214, and inductor 230, falls below the specified output voltage. Another scenario include a case where the two battery power conditioner 206 receives a specified output voltage that is greater than output voltage of the first battery 202 less the voltage drop caused by the above described path between the output of the first battery 202 and the load 246. In a case where the specified voltage to be delivered to the load exceeds the voltage that can be delivered by receiving electrical current from only the first battery 202, the pulse controller of one example switches to the second mode of operation, where electrical current is drawn from the series combination of the first battery 202 and the second battery 204.

In the second time segment 362, the two battery power conditioner 206 operates in the second mode and receives electrical current from the series connected pair of batteries consisting of the first battery 202 and the second battery 204. In this second mode of operation, the two battery power conditioner 206 receives an input voltage that is equal to the sum of the output voltages of the first battery 202 and the second battery 204. In this second mode of operation, transistor A 210 and transistor D 216 operate in a manner that is similar to that discussed above for transistor B 212 and transistor D 216. In this second mode of operation, transistor A 210 and transistor D 216 alternate between conducing states and not conducting states, with transistor A 210 being in the opposite state that transistor D 216 is in at a given time. The combination of transistor A 210 and transistor D 216 similarly operate in a "voltage bucking" regulation mode to provide the specified output voltage to the load 246.

The second time segment 362 includes a third time interval 338, a fourth time interval 340, and a fifth time interval 342. During the third time interval 338, the output A level versus time relationship 302 indicates that the output A 252 is in a high state. The output D level versus time relationship 308 indicates that Output D 258 is in a low state during the third time interval 338. In a fourth time interval 340, which immediately follows the third time interval 338 in the illustrated example, the output A level versus time relationship 302 indicates that the output A 252 is in a low state and output D level versus time relationship 308 indicates that Output D 258 is in a high state, thus alternating from their states of the previous time interval. The output A level versus time relationship 302 and the output D level versus time relationship 308 indicate that these two levels again invert during the fifth time interval 342.

The output C level versus time relationship 306 indicates that during the second time segment 362, transistor C 214 is in a non-conducting state. In the illustrated example, transistor C 214 is placed into a non-conducting state to preclude current from flowing back through the transistor pair 248. Transistor C 214 is incorporated into the transistor pair 248 to preclude the internal diode of transistor B 212 from conducting when it becomes reverse biased due to the voltage of the second battery that is present across the transistor pair 248 when transistor A 220 is conducting.

Figure 4:
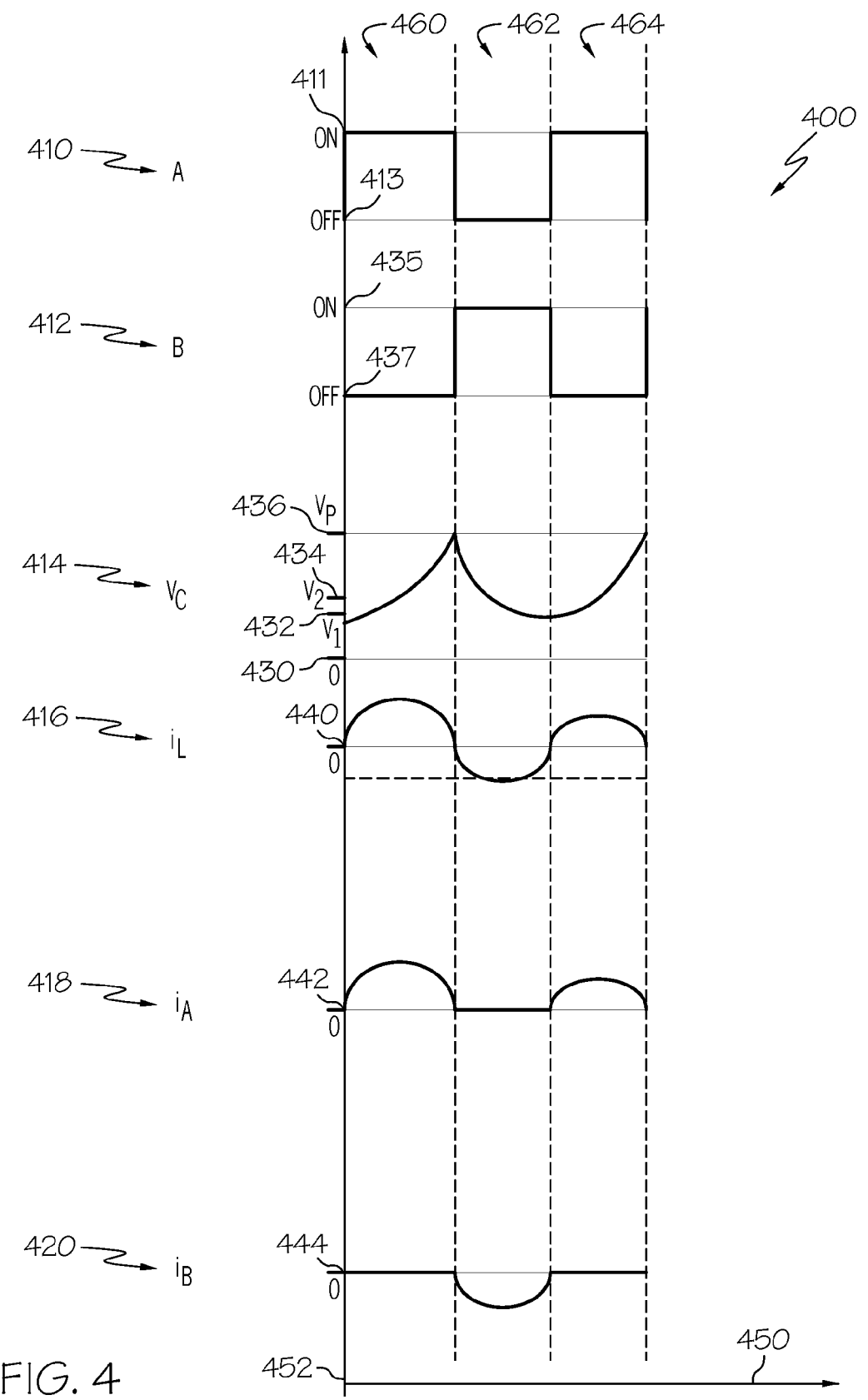
FIG. 4 illustrates an energy transfer transistor control timing diagram, in accordance with one example.

FIG. 4 illustrates an energy transfer transistor control timing diagram 400, in accordance with one example. The energy transfer transistor control timing diagram 400 illustrates timing relationships between the outputs of the pulse controller 250 in controlling the four transistors of the above described two battery power conditioner 206 when energy is being transferred from the second battery 204 to the first battery 202. The energy transfer transistor control timing diagram 400 depicts an operating mode of the two battery power conditioner 206 that corresponds to the above described first example of the third mode of operation. The second example of the third mode of operation operates similarly with the roles of transistor A 210 and transistor B 212 reversed. Further, in the second example of the third mode of operation, transistor D 216 is able to be turned on for a brief period after the voltage across capacitor 232 reaches a maximum value, such as after transistor B 212 is turned off, to connect one end of inductor 230 to ground and cause electrical current to flow through inductor 230. Allowing electrical current to flow from capacitor 232 to ground through inductor 230 allow energy to be stored in inductor 230. After the brief period during which transistor D 216 is on, transistor D 216 is turned off and transistor A 210 is turned on. The energy stored in inductor 230 due to transistor D 216 being on for a brief period causes the voltage across the series connected inductor 230 and capacitor 232 to rise to a level that allows electrical current to flow into the series combination of the first battery 202 and the second battery 204 when transistor A 210 is on.

In one example, the two battery power conditioner 206 generally enters the third mode of operation when the load 246 is in a standby or low energy consumption mode and is not sensitive to power supply voltage variations. In further examples, the load 246 is able to draw electrical current. In a case where electrical current is drawn by the load 246, the voltage and current characteristics described below may be different but will be similar to those described below.

The energy transfer transistor control timing diagram 400 includes a time axis 450 and an output level axis 452. The time axis 450 is divided into time intervals that correspond to intervals of time that outputs of the pulse controller 250 are held at a particular level in this example. The time axis 450 is divided into three time intervals, a first time interval 460, a second time interval 462, and a third time interval 464. As described below, the pulse controller 250 in the first example of the third mode of operation controls the transistors of the two battery power conditioner 206 so as to cause electrical energy to be transferred from the second battery 204 to the first battery 202.

The vertical dimension of the energy transfer transistor control timing diagram 400 depicts the levels, which may correspond to values of voltage or current, of various signals, as is discussed below. A first set of signals depicted in the vertical dimension of the energy transfer transistor control timing diagram 400 include an output A level versus time relationship 410 and an output B level versus time relationship 412. These two relationships reflect the logic levels of the control voltages applied to the gates of transistor A 210 and transistor B 212 of the two battery power conditioner 206 depicted above in FIG. 2. The output A level versus time relationship 410 depicts an output A "off" level 413 and an output A "on" level 411. The output B level versus time relationship 412 similarly depicts an output B "off" level 437 and an output B "on" level 435. These relationships represent quantities that are described above for the output A level versus time relationship 302 and an output B level versus time relationship 304, but reflect those logic levels during the first example of the third mode of operation. As is generally understood, the logic levels depicted for the output A level versus time relationship 410 and the output B level versus time relationship 412 are able to correspond to voltage levels of those signals, or the actual voltage levels of those signals is able to be reversed based upon the design of the logic circuits implementing transistor A 210 and transistor B 212.

It is further noted that in the first example of the third mode of operation that is depicted in the energy transfer transistor control timing diagram 400, the pulse controller 250 operates to place and maintain transistor C 214 in a conductive state and transistor D 216 in a non-conductive state. In other words, in the first example of the third mode of operation corresponding to the energy transfer transistor control timing diagram 400, output C 256 is in a logic high state and output D 258 is in a logic low state for all of the first time interval 460, the second time interval 462 and the third time interval 464. It is noted, however, that in the second example of the third mode, the output D 258 is placed in a logic high state for a brief period after transistor B 212 is turned off, which is a time point when the voltage across capacitor 232 reaches a maximum value. Placing output D 258 into a logic high state causes transistor D 216 to conduct, and connects one end of inductor 230 to ground to allow electrical current to flow through inductor 230, which results in storing energy in inductor 230. After this brief period, output D 258 is placed in a logic low state to turn off transistor D 216, and output A 252 is placed into a logic high state to turn transistor A 210 on. The energy stored in inductor 230 due to the flowing electrical current causes the voltage across inductor 230 to increase to a level that allows to allow energy from the series connected capacitor 232 and inductor 230 to be transferred to the series combination of the first battery 202 and the second battery 204 when transistor A 210 is turned on.

The energy transfer transistor control timing diagram 400 further depicts a capacitor voltage versus time relationship 414. The capacitor voltage versus time relationship 414 reflects, for the first time interval 460, the second time interval 462 and the third time interval 464, the voltage across capacitor 232 of the two battery power conditioner schematic diagram 200 depicted above in FIG. 2. The output level axis 452 indicates a $V_1$ level 430, a $V_2$ level 434, and a zero voltage level 430, for the capacitor voltage versus time relationship 414. The $V_1$ level 430 indicates the output voltage of the first battery 202 and the $V_2$ level 434 indicates the output level of the series combination of the first battery 202 and the second battery 204.

The energy transfer transistor control timing diagram 400 also depicts an inductor current versus time relationship 416 that reflects the electrical current flowing through inductor 230 of the two battery power conditioner schematic diagram 200 depicted above in FIG. 2. The output level axis 452 indicates a zero inductor current level 440 for the inductor current versus time relationship 416. Current values flowing through the inductor 230 from either the connection of transistor A 210 or transistor B 212 and inductor 230 to the capacitor 232 are depicted as positive, or above, the zero inductor current level 440. Current flowing through inductor 230 from capacitor 232 to the connection of the inductor 230 with transistor A 210 and transistor B 212 are shown as negative, or below, the zero inductor current level 440.

The energy transfer transistor control timing diagram 400 also depicts a transistor A current ($i_a$) versus time relationship 418 and a transistor B current ($i_b$) versus time relationship 420 that reflect, respectively, electrical current flowing through transistor A 210 and transistor B 212 of the two battery power conditioner schematic diagram 200 depicted above in FIG. 2 during the first time interval 460, the second time interval 462 and the third time interval 464. The transistor A current ($i_a$) versus time relationship 418 depicts a transistor A zero current level 442 and the transistor B current ($i_b$) versus time relationship 420 depicts a transistor B zero current level 444.

During the first time interval 460, output A level versus time relationship 410 indicates that transistor A 210 is placed in a conducting mode and the output B level versus time relationship 412 indicates the transistor B 212 is placed in a non-conducting mode. In this configuration, electrical energy flows through transistor A 210, through inductor 230 and into capacitor 232. The electrical current flowing through transistor A 210 and inductor 230 is reflected during the first time interval 460 by the inductor current versus time relationship 416 and the transistor A current versus time relationship 418. The illustrated first time interval 460 is assumed to follow a preceding time interval of the third operating mode. For reasons discussed below, the voltage across capacitor 232 is less than $V_1$ at the beginning of the first time interval 460.

When transistor A 210 is placed into a conductive state, the inductor current reflected by the inductor current versus time relationship 416 begins to increase and then decreases as the capacitor voltage, as depicted in the capacitor voltage versus time relationship 414, increases. Due to the inductive properties of inductor 230, inductor current continues to flow even as the capacitor voltage increases beyond $V_2$, i.e., the voltage roughly present at the output of transistor A 210 and driving the series combination of inductor 230 and capacitor 232, until the voltage across capacitor 232 reaches a value of $V_p$ 436. As depicted in the capacitor voltage versus time relationship 414, the voltage across capacitor 232 increases until the end of the first time interval 460, at which time the voltage across capacitor 232 reaches the peak value $V_p$ 436. As depicted in the inductor current versus time relationship 416, the current through inductor 230 monotonically decreases during the latter part of the first time interval 460 and reaches the zero inductor current level 440 at the end of the first time interval 460. The end of the first time interval 460, at which time the conducting state of transistor A 210 and transistor B 212 is commanded to change, is able to be determined by monitoring the voltage across capacitor 232 to determine the occurrence of $V_p$ 436 or monitoring the inductor current ($i_b$) to determine when it reaches a low, or zero value.

During the second time interval 462, output A level versus time relationship 410 indicates that transistor A 210 is placed in a non-conducting mode and the output B level versus time relationship 412 indicates the transistor B 212 is placed in a conducting mode. In this configuration, electrical energy flows from capacitor 232 through inductor 230, through the transistor pair 248 including transistor C 214 and transistor B 212, and into the first battery 202. The electrical current flowing through transistor B 212 and inductor 230 is reflected during the second time interval 462 by the inductor current versus time relationship 416 and the transistor B current versus time relationship 420. When transistor B 212 is placed into a conductive state, the inductor current reflected by the inductor current versus time relationship 416 begins to increase and then decreases as the capacitor voltage reflected by the capacitor voltage versus time relationship 414 decreases. Due to the inductive properties of inductor 230, inductor current continues to flow even as the capacitor voltage decreases beyond $V_1$. As depicted in the capacitor voltage versus time relationship 414, the voltage across capacitor 232 decreases until the end of the second time interval 462.

The third time interval 464 is similar to the first time interval 460, discussed above. The output A level versus time relationship 410 indicates that transistor A 210 is placed in a conducting mode and the output B level versus time relationship 412 indicates the transistor B 212 is placed in a non-conducting mode during the third time interval 464. In this configuration, electrical energy flows through transistor A 210, through inductor 230 and into capacitor 232. As discussed above with regards to the second time interval, the voltage across capacitor 232 at the beginning of the third time interval 464 is lower than $V_1$ due to the operation of inductor 230 in transferring energy to the first battery 202. The voltage across capacitor 232 at the beginning of the first time interval 460 is lower than $V_1$ for the same reason. It is to be noted that the electrical current flowing through inductor 230 and transistor A 210 during the third time interval 464 are also similar to the same quantities during the first time interval 460.

The above described energy transfer transistor control timing diagram 400 describes controlling the four transistors of the above described two battery power conditioner 206 when energy is being transferred from the second battery 204 to the first battery 202. It is clear that a similar timing diagram is used to transfer energy from the first battery 202 to the second battery 204. As described above for the second example of the third mode of operation, the two battery power conditioner 206 is able operate to transfer energy from the first battery 202 to the capacitor 232 and then to the series connected combination of the first battery 202 and the second battery 204. In particular, the relationship of output A level versus time relationship 410 and an output B level versus time relationship 412 and the resulting transistor A current versus time relationship 418 and a transistor B current versus time relationship 420 are generally reversed. The magnitudes and shape of the transistor A current versus time relationship 418 and the transistor B current versus time relationship 420 curves may, however, differ to reflect the different voltages across the reactive components during the depicted time intervals.

Further, in the second example of the third mode of operation, after energy is transferred from the first battery 202 to the capacitor 232 by configuring transistor B 212 to conduct and causing the voltage across capacitor 232 to reach a high value, transistor D 216 is able to be turned on for a brief period after the transistor B 212 is turned off to allow electrical current to flow from the capacitor 232 through the inductor 230 to ground so as to store energy in the inductor 230. After this brief period, transistor D 216 is configured to not conduct and transistor A 210 is configured to conduct, allowing electrical current to flow through inductor 230 into the series combination of the first battery 202 and the second battery 204. Allowing energy to be stored in inductor 230 prior to configuring transistor A 210 to conduct, by configuring transistor D 216 to conduct for a brief period, allows the voltage across inductor 230 to increase to a level that causes electrical current to flow into the series combination of the first battery 202 and the second battery 204 when transistor A 210 is configured to conduct.

Figure 5:
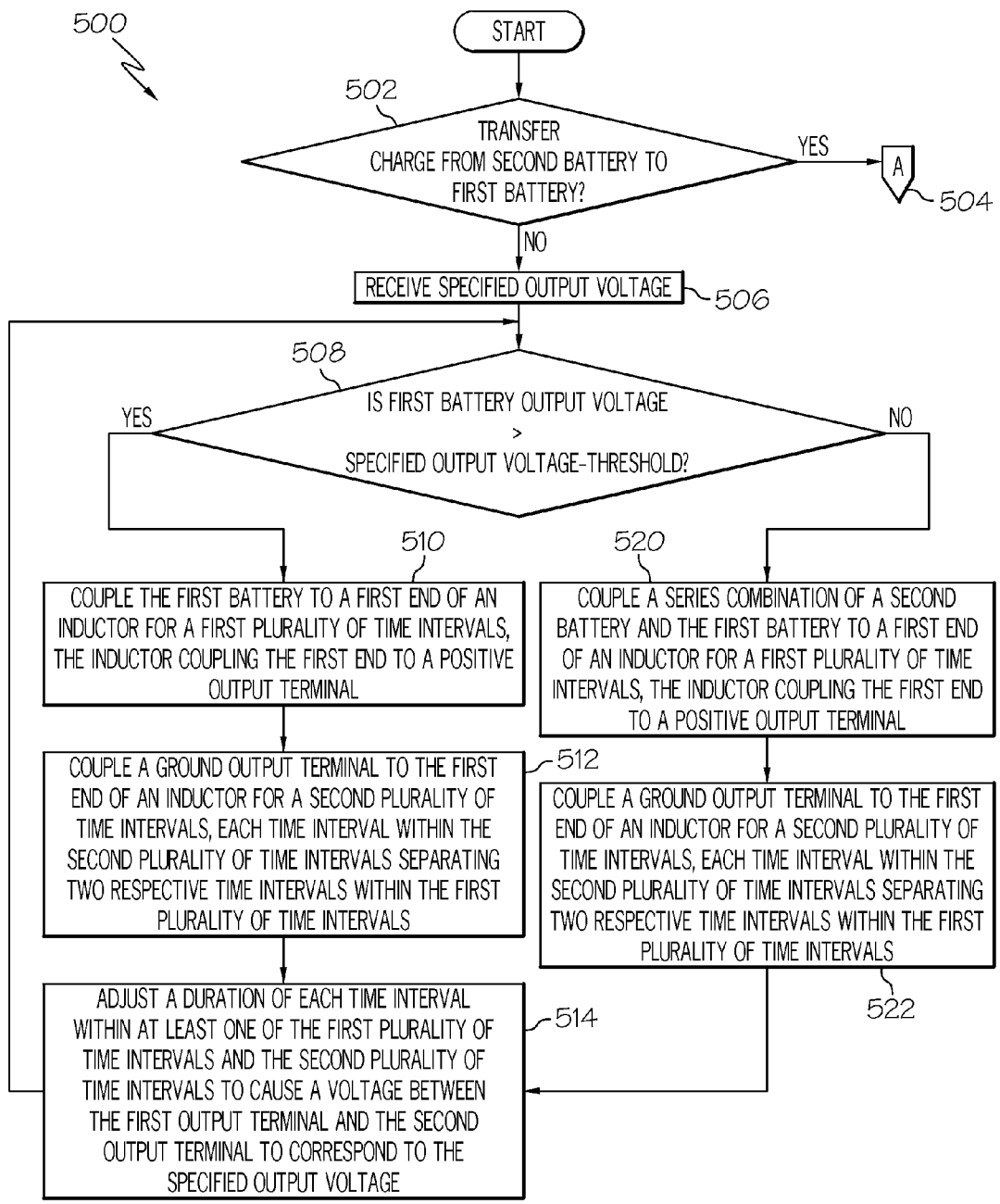
FIG. 5 illustrates a two battery power conditioner operating flow, in accordance with one example.

FIG. 5 illustrates a two battery power conditioner operating flow 500, in accordance with one example. The following discussion refers to the components depicted in and described with regards to the two battery power conditioner schematic diagram 200 of FIG. 2. Referring to FIG. 2, the two battery power conditioner operating flow 500 illustrates an example of a process performed by the pulse controller 250 to maintain a specified output voltage across two output terminal of a power supply output port 240 of the two battery power conditioner 206.

The two battery power conditioner operating flow 500 begins by determining, at 502, if a transfer of energy is to be made from second battery to first battery. Transferring energy from a second battery to a first battery is referred to and described above as a first example of the third operating mode of the two battery power conditioner 206. If it is determined that energy is to be transferred between the second battery and the first battery, the two battery power conditioner operating flow 500 proceeds to process "A" 504. Process "A" is a processing flow for transferring energy from a second battery to a first battery and is described in further detail below.

The two battery power conditioner operating flow 500 continues in one example by receiving, at 506, a specified output voltage. The received specified output voltage indicates the voltage to be produced between the two terminals of the power supply output port 240. Further examples are able to operate with configured specified output voltages that are fixed or that are adjusted by various techniques.

The two battery power conditioner operating flow 500 continues by determining, at 508, if the first battery output voltage is greater than a difference between the received specified output voltage and a voltage threshold. The voltage threshold in one example set according to an expected voltage drop out of the circuitry coupling the first battery 202 to the output port 240 such as is caused by voltage losses across switching devices or by limitations caused by less than 100% conducting duty cycles for transistors within switching voltage regulators. The voltage threshold is also able to incorporate a quantity to anticipate a reduction in the output voltage of the first battery 202 during circuit operation. Such a reduction in output voltage is able to be caused by increased electrical current demand by the load 246 due to different operating modes, or by depletion of charge of the first battery 202.

In the case that the first battery output voltage is greater than a difference between the received specified output voltage and a voltage threshold, the two battery power conditioner operating flow 500 proceeds to couple, at 510, the first battery 202 to a first end of the inductor 230 for a first plurality of time intervals. As depicted in FIG. 2, this coupling is through the transistor pair 248. The inductor 230 couples the first battery 202 and the transistor pair 248 to a positive output terminal of the power supply output port 240. As described above with regards to FIG. 3, the first battery 202 is coupled to a first end of the inductor 230 through the transistor pair 248 during the first time interval 330 and the first part of the second time period 336.

The two battery power conditioner operating flow 500 continues by coupling, at 512, a ground output terminal to the first end of an inductor for a second plurality of time intervals. Each time interval within the second plurality of time intervals separates two respective time intervals within the first plurality of time intervals. As described above with regards to FIG. 3, the first end of the inductor 230 is coupled through transistor D 216 during the second time interval 332 and the latter part of the second time period 336.

In the event that it was determined, at 508, that the first battery voltage is not greater than a difference between the received specified output voltage and a voltage threshold, the two battery power conditioner operating flow 500 proceeds to couple a series combination of the second battery 204 and the first battery 202 to a first end of an inductor 230 for a first plurality of time intervals. As described above with regards to FIG. 3, the series combination of the second battery 204 and the first battery 202 is coupled to a first end of the inductor 230 through transistor A 210 during the third time interval 338 and the fifth time interval 342.

The two battery power conditioner operating flow 500 continues by coupling, at 522, the ground output terminal of the power supply output port 240 to the first end of an inductor 230 for a second plurality of time intervals. Each time interval within the second plurality of time intervals separates two respective time intervals within the first plurality of time intervals. As described above with regards to FIG. 3, the first end of the inductor 230 is coupled through transistor D 216 during the fourth time interval 340.

After coupling the ground output terminal ground output terminal of the power supply output port 240 to the first end of an inductor 230 for the second plurality of time intervals as a result of either of the above two described conditions, the two battery power conditioner operating flow 500 continues by adjusting, at 514, a duration of each time interval within at least one of the first plurality of time intervals and the second plurality of time intervals to cause the voltage between the first output terminal and the second output terminal of the power supply output port 240 to correspond to the specified output voltage. The two battery power conditioner operating flow 500 then returns to determine, at 508, if the first battery output voltage is greater than a difference between the received specified output voltage and a voltage threshold.

Figure 6:
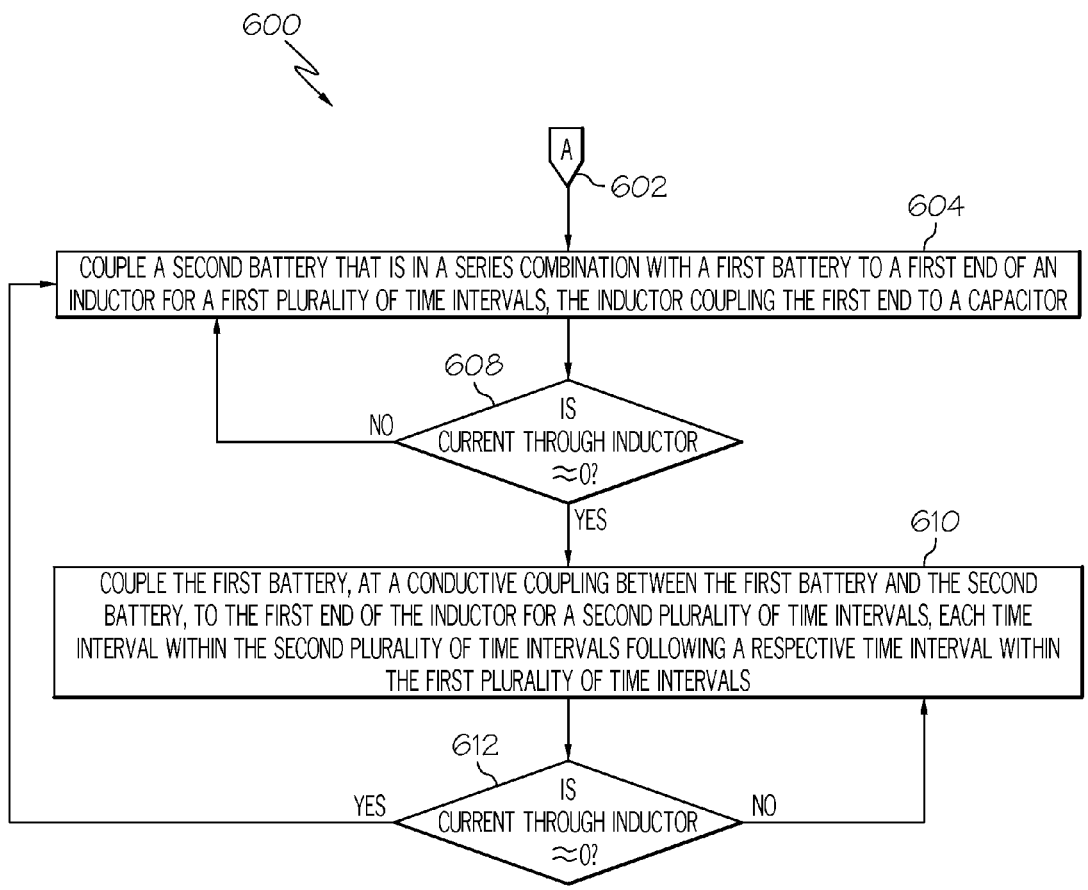
FIG. 6 illustrates an electrical energy transfer processing flow, according to one example.

FIG. 6 illustrates an electrical energy transfer processing flow 600, according to one example. The electrical energy transfer processing flow 600 is an example of a process that is performed in response to the above described determination in the two battery power conditioner operating flow 500 of FIG. 5 that electrical energy is to be transferred from the second battery to the first battery of the battery powered wireless communications device schematic diagram 100.

The electrical energy transfer processing flow 600 begins by coupling, at 604, a second battery 204 that is in a series combination with a first battery 202 to a first end of an inductor 230 for a first plurality of time intervals. As shown in FIG. 2, the inductor 230 couples its first end to a capacitor 232. The electrical energy transfer processing flow 600 continues by determining, at 608, if the electrical current through inductor 230 is approximately equal to zero (0). If the electrical current through the inductor 230 is not approximately equal to zero, the electrical energy transfer processing flow 600 returns to coupling, at 604, the second battery 204 to the inductor 230.

If it is determined that the electrical current through the inductor 230 is approximately equal to zero, the electrical energy transfer processing flow 600 couples, at 610, the first battery, at a conductive coupling between the first battery 202 and the second battery 204, to the first end of the inductor 230 for a second plurality of time intervals. Each time interval within the second plurality of time intervals following a respective time intervals within the first plurality of time intervals.

The electrical energy transfer processing flow 600 continues by determining, at 612, if the electrical current through inductor 230 is approximately equal to zero (0). If the electrical current through the inductor 230 is not approximately equal to zero, the electrical energy transfer processing flow 600 returns to coupling, at 604, the first battery 202 to the inductor 230. If it is determined that the electrical current through the inductor 230 is approximately equal to zero, electrical energy transfer processing flow 600 returns to coupling, at 604, the second battery 204 that is in a series combination with the first battery 202 to the first end of an inductor 230.

The above described electrical energy transfer processing flow 600 describes transferring energy between the two batteries by coupling batteries to the first end of the inductor, or series reactive circuit, for a first plurality of time intervals and the second plurality of time intervals. In the above described processing, the duration of each time interval within these two plurality of time intervals is determined by monitoring the electrical current flowing through the inductor 230. In further examples, the duration of one or more time intervals within these two plurality of time intervals is defined prior to that time interval. In one example, the duration of each time interval in the first plurality of time intervals and in the second plurality of time intervals is set by the pulse controller 250 prior to performing the electrical energy transfer processing flow 600 or at times during the performance of the electrical energy transfer processing flow 600. In one example, the durations of the time intervals within the first plurality of time intervals and within the second plurality of time intervals are defined according to an algorithm that defines those intervals based upon the output voltage values of the first battery and the second battery. In further examples, the time intervals in the first plurality of time intervals and in the second plurality of time intervals are able to be determined by various fixed or adaptive algorithms, empirical data collected by and stored within a controller, or by other techniques.

Figure 7:
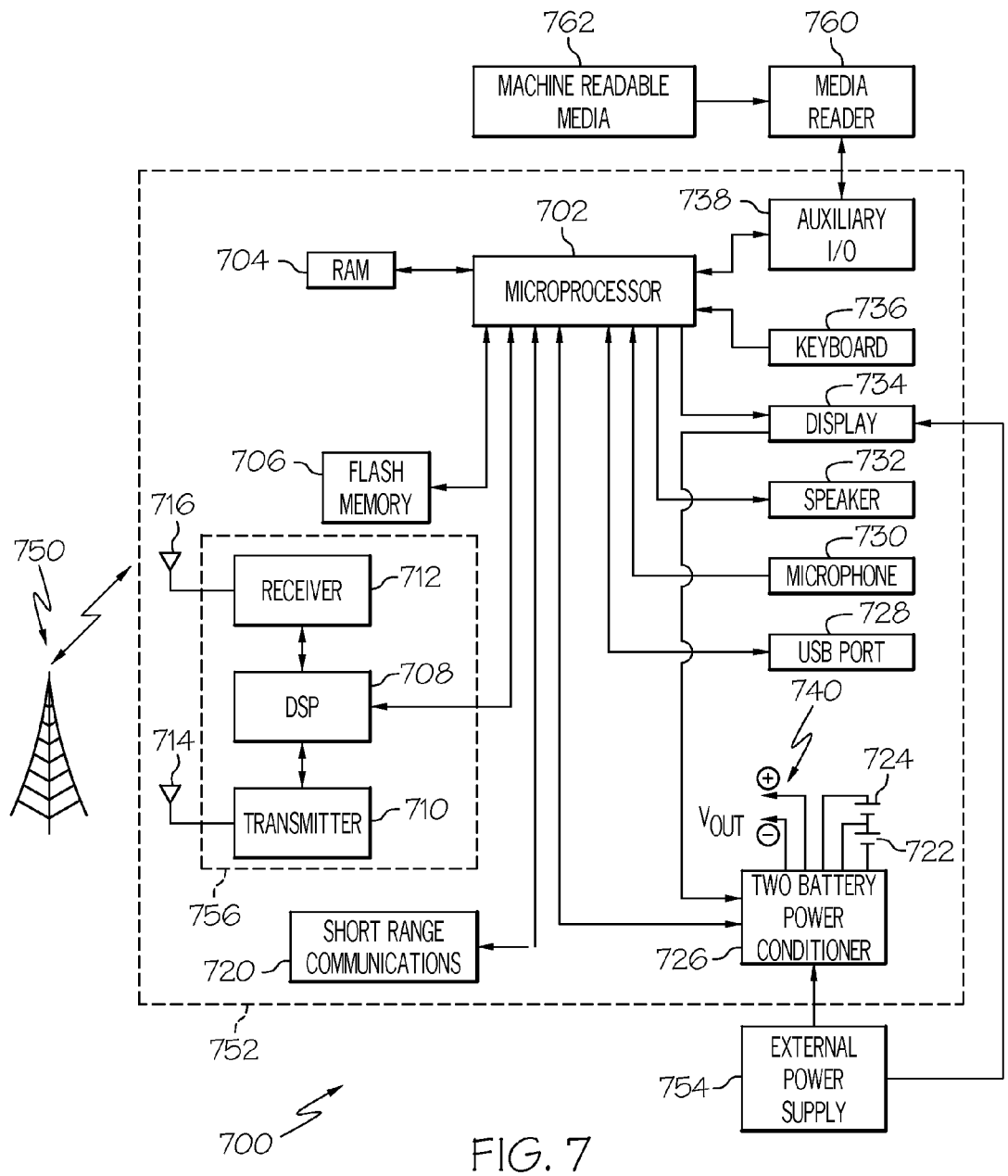
FIG. 7 is a block diagram of an electronic device and associated components in which the systems and methods disclosed herein may be implemented.

FIG. 7 is a block diagram of an electronic device and associated components 700 in which the systems and methods disclosed herein may be implemented. In this example, an electronic device 752 is a portable, handheld electronic device that consists of a wireless two-way communication device with voice and data communication capabilities. Such electronic devices communicate with a wireless voice or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone or smart phone with data messaging capabilities, a wireless Internet appliance, a laptop computer, a tablet computing device, a navigation device or a data communication device that may or may not include telephony capabilities. Some of these devices may be handheld.

The illustrated electronic device 752 is an example electronic device that includes two-way wireless communications functions. Such electronic devices incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, USB Port 728, display 734, keyboard 736, speaker 732, microphone 730, a short-range communications subsystem 720, two battery power conditioner 726, and any other device subsystems.

The two battery power conditioner 726 is coupled to two series connected batteries, a first battery 722 and a second battery 724. The two battery power conditioner is further coupled to the connection between the first battery 722 and the second battery 724. The interconnections between and among the two battery power conditioner 726, the first battery 722, and the second battery 724 allow the two battery power conditioner to draw electrical current from just the first battery 722, or from the series connected combination of the first battery 722 and the second battery 724. The two battery power conditioner 726 provides Direct Current power through an output port 740, which has positive and negative terminals. The two battery power conditioner 726, as described above, is able to receive inputs specifying the output voltage that is to be delivered between the two terminals of the output port 740. The two battery power conditioner 726 in one example is further able to receive electrical power from an external power supply 754 through either a dedicated connector or through a USB port 728.

In one example, the two battery power conditioner 726 includes a controller that performs the two battery power conditioner operating flow 500 and electrical energy transfer processing flow 600. In further examples, some or all of the two battery power conditioner operating flow 500 and the electrical energy transfer processing flow 600 is able to be performed by microprocessor 702, another processor (not shown), or a combination of two or more of microprocessor 702, a processor within the two battery power conditioner 726, and another processor.

The USB port 728 provides data communication between the electronic device 752 and one or more external devices. Data communication through USB port 728 enables a user to set preferences through the external device or through a software application and extends the capabilities of the device by enabling information or software exchange through direct connections between the electronic device 752 and external data sources rather than through a wireless data communication network.

Operating system software used by the microprocessor 702 is stored in flash memory 706. Further examples are able to use a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704. As an example, computer executable programs configured to perform the several component power pack failure determination processes that are described above are included in a software module stored in flash memory 706.

The microprocessor 702, in addition to its operating system functions, is able to execute software applications on the electronic device 752. A set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 752 through, for example, the wireless network 750, an auxiliary I/O device 738, USB port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the USB port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 732 and signals for transmission are generally produced by a microphone 730. Alternative voice or audio I/O subsystems, such as a voice message recording subsystem, may also be implemented on the electronic device 752. Although voice or audio signal output is generally accomplished primarily through the speaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if a component power pack within a rechargeable power pack is determined to have failed, then voice functions may be disabled, but data communications, such as e-mail, may still be enabled over the communication subsystem.

A short-range communications subsystem 720 is a further optional component which may provide for communication between the electronic device 752 and different systems or devices, which need not necessarily be similar devices. For example, the short-range communications subsystem 720 may include an infrared device and associated circuits and components or a Radio Frequency based communication module such as one supporting Bluetooth® communications, to provide for communication with similarly-enabled systems and devices.

A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the USB port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A power conditioner, comprising:
    a series reactive circuit comprising an inductor and a capacitor coupled in a substantially series connection, the capacitor being connected to a power supply output port in a substantially parallel configuration;
    a power pack interface comprising a first selectably conductive path configurable to couple electrical current between a first power pack and the series reactive circuit, and further comprising a second selectably conductive path configurable to couple electrical current between a substantially series connected combination of the first power pack and a second power pack and the series reactive circuit;
    a controller, communicatively coupled to the power pack interface, configured to:
        configure, based upon determining that a first power pack output voltage is above a voltage threshold that is based on a specified output voltage, one of the first selectably conductive path and the second selectably conductive path to couple electrical current to the series reactive circuit; and
        configure the power pack interface to transfer energy from one of the second power pack and the first power pack to another of the first power pack and the second power pack, by being configured to:
            configure one of the first selectably conductive path and the second selectably conductive path to couple electrical current for a first time interval; and
            configure, subsequent to the first time interval, another of the first selectably conductive path and the second selectably conductive path to couple electrical current for a second time interval.

2. The power conditioner of claim 1, the controller further configured to receive an indication of the specified output voltage, and
    wherein the specified output voltage is based upon the indication.

3. The power conditioner of claim 1, wherein the controller is further configured to:
    receive a time series of values of the first power pack output voltage, each value in the time series of values reflecting a respective first power pack output voltage determined at a time that is different than other values in the time series of values, and
    wherein the controller is further configured to configure one of the first selectably conductive path and the second selectably conductive path in response to receiving each value of the first power pack output voltage within the time series.

4. The power conditioner of claim 1, wherein the first time interval and the second time interval are defined prior to configuring the power pack interface to transfer energy from one of the second power pack and the first power pack to another of the first power pack and the second power pack.

5. The power conditioner of claim 1, wherein the controller is further configured to determine the first time interval and the second time interval by determining a respective end of each of the first time interval and the second time interval by being configured to determine, subsequent to configuring one of the first selectably conductive path and the second selectably conductive path to couple electrical current for a first time interval, that electrical current following through the inductor reduces to below an inductor current threshold.

6. The power conditioner of claim 5, wherein the inductor current threshold is substantially zero.

7. The power conditioner of claim 6, wherein the controller further receives an indication of a voltage across the capacitor,
    wherein the controller is configured to determine that the electrical current flowing through the inductor reaches the inductor current threshold by determining that the voltage across the capacitor reaches a maximum value.

8. A electronic device, comprising:
    a housing;
    an electrical load configurable to operate in a plurality of modes, wherein the electrical load operates with a first power supply voltage when operating in a first mode and operates with a second power supply voltage when operating in a second mode, wherein the electrical load has an expected mode time ratio, the expected mode time ratio comprising a ratio of a time that the electrical load is expected to operate in the first mode and a time that the electrical load is expected to operate in the second mode;

a controller configured to specify, based upon a present mode in which the electrical load is operating, a specified output voltage, the specified output voltage corresponding to the first power supply voltage when the electrical load is operating in the first mode and to the second power supply voltage when the electrical load is operating in the second mode;

a substantially series connected combination of a first power pack and a second power pack, the first power pack having a first total capacity and the second power pack having a second total capacity, wherein a ratio between the first total capacity and the second total capacity is based upon the expected mode time ratio; and a power conditioner, comprising:
 a series reactive circuit comprising an inductor and a capacitor coupled in a substantially series connection, the capacitor being connected to a power supply output port in a substantially parallel configuration;
 a power pack interface comprising a first selectably conductive path configurable to couple electrical current between a first power pack and the series reactive circuit, and further comprising a second selectably conductive path configurable to couple electrical current between a substantially series connected combination of the first power pack and a second power pack and the series reactive circuit; and
 a conductive path controller configured to configure, based upon determining that a first power pack output voltage is above a voltage threshold that is based on a specified output voltage, one of the first selectably conductive path and the second selectably conductive path to couple electrical current to the series reactive circuit.

9. The electronic device of claim 8, wherein the substantially series connected combination of a first power pack and a second power pack is non-removably mounted within the housing.

10. A method operating a power supply, the method comprising:
 performing at least one of the following with a processor:
 configuring, based upon determining that a first power pack output voltage is above a voltage threshold, the voltage threshold based on a specified output voltage at an output port, one of a first selectably conductive path and a second selectably conductive path to couple electrical current to a series reactive circuit,
 wherein the series reactive circuit comprising an inductor and a capacitor coupled in a substantially series connection, and the output port being connected to the capacitor in a substantially parallel configuration, and
 wherein the first selectably conductive path is configurable to couple electrical current between a first power pack and the series reactive circuit and the second selectably conductive path is configurable to couple electrical current between a substantially series connected combination of the first power pack and a second power pack and the series reactive circuit; and
 transferring energy from one of the second power pack and the first power pack to another of the first power pack and the second power pack, the transferring comprising:
 configuring one of the first selectably conductive path and the second selectably conductive path to couple electrical current for a first time interval; and
 configuring, subsequent to the first time interval, another of the first selectably conductive path and the second selectably conductive path to couple electrical current for a second time interval.

11. The method of claim 10, further comprising receiving an indication of the specified output voltage, and
 wherein the specified output voltage is based upon the indication.

12. The method of claim 10, further comprising receiving a time series of values of the first power pack output voltage, each value in the time series of values reflecting a respective first power pack output voltage determined at a time that is different than other values in the time series of values, and
 wherein the configuring the one of the first selectably conductive path and the second selectably conductive path is in response to receiving each value of the first power pack output voltage within the time series.

13. The method of claim 10, wherein the first time interval and the second time interval are defined prior to the first time interval.

14. The method of claim 10, wherein the transferring charge further comprises:
 determining, during the first time interval, the end of the first time interval; and
 determining, during the second time interval, the end of the second time interval,
 wherein the end of the first time interval and the end of the second time interval occurs when electrical current flowing through the inductor reduces to below an inductor current threshold.

15. The method of claim 14, wherein the inductor current threshold is substantially zero.

16. The method of claim 15, further comprising receiving an indication of a voltage across the capacitor, and
 wherein the determining that the electrical current flowing through the inductor reaches the inductor current threshold comprises determining that the voltage across the capacitor reaches a maximum value.

* * * * *